United States Patent
Reyes et al.

(10) Patent No.: US 6,386,990 B1
(45) Date of Patent: *May 14, 2002

(54) COMPOSITE GOLF CLUB HEAD WITH INTEGRAL WEIGHT STRIP

(75) Inventors: Herbert Reyes, Laguna Nigel; James M. Murphy, Oceanside; D. Clayton Evans, San Marcos; J. Andrew Galloway, Escondido; Daniel R. Jacobson, San Diego, all of CA (US)

(73) Assignee: Callaway Golf Company, Carlsbad, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/474,688

(22) Filed: Dec. 29, 1999

Related U.S. Application Data (63) Continuation-in-part of application No. 08/958,723, filed on Oct. 23, 1997, now Pat. No. 6,010,411.

(51) Int. Cl.⁷ .............................................. A63B 53/04
(52) U.S. Cl. ........................ 473/344; 473/345; 473/348
(58) Field of Search ................................ 473/335, 336, 473/345, 347, 348, 349, 344

(56) References Cited

U.S. PATENT DOCUMENTS

| | | | |
|---|---|---|---|
| 1,658,581 A | | 2/1928 | Tobia |
| 3,941,390 A | * | 3/1976 | Hussey |
| 4,496,153 A | | 1/1985 | Kochevar |
| 4,502,687 A | | 3/1985 | Kochevar |
| 4,575,447 A | * | 3/1986 | Horiguchi |
| 4,667,963 A | | 5/1987 | Toneyama |
| 4,778,722 A | | 10/1988 | Yamamure et al. |
| 4,793,616 A | | 12/1988 | Fernandez |
| 4,874,171 A | | 10/1989 | Ezaki et al. |
| 5,009,425 A | | 4/1991 | Okumoto et al. |
| 5,190,290 A | | 3/1993 | Take |
| 5,228,694 A | | 7/1993 | Okumoto |
| 5,242,168 A | | 9/1993 | Aizawa |
| 5,262,118 A | | 11/1993 | Fukushima et al. |
| 5,318,296 A | | 6/1994 | Adams et al. |
| 5,350,556 A | | 9/1994 | Abe |
| 5,377,986 A | | 1/1995 | Viollaz et al. |
| 5,429,365 A | | 7/1995 | McKeighton |
| 5,485,998 A | * | 1/1996 | Kobayashi |
| 5,489,098 A | | 2/1996 | Gojny et al. |
| 5,533,728 A | | 7/1996 | Pehoski |
| 5,547,427 A | | 8/1996 | Rigal et al. |
| 5,593,356 A | | 1/1997 | Takeda |
| 5,672,120 A | | 9/1997 | Ramirez |
| 5,674,133 A | | 10/1997 | Chang |
| 5,779,560 A | | 7/1998 | Buck |
| 5,971,867 A | * | 10/1999 | Galy ........................... 473/345 |
| 5,989,134 A | | 11/1999 | Antonious |
| 6,102,813 A | * | 8/2000 | Dill ............................. 473/305 |
| 6,123,627 A | * | 9/2000 | Antonious |

FOREIGN PATENT DOCUMENTS

GB     2 292 332 A     4/1994

* cited by examiner

*Primary Examiner*—Stephen Blau
(74) *Attorney, Agent, or Firm*—Michael A. Catania

(57) ABSTRACT

A golf club head composed of a composite material and having a metal weight strip in a ribbon section is disclosed herein. The metal strip may be composed of copper, tungsten or a similar metal. The composite golf club head may also have a sole plate composed of stainless steel attached to a sole of the golf club head. The golf club head is preferably composed of plies of pre-preg sheets. A method for fabricating the golf club head is also disclosed herein. The method uses a three-piece mold and bladder to produce a composite golf club head with a metal weight strip embedded in the ribbon.

4 Claims, 11 Drawing Sheets

COMPOSITE GOLF CLUB HEAD WITH INTEGRAL WEIGHT STRIP

CROSS REFERENCES TO RELATED APPLICATIONS

This application is a continuation-in-part application of U.S. patent application Ser. No. 08/958,723, now U.S. Pat. No. 6,010,411, on Oct. 23, 1997, which is hereby incorporated by reference in its entirety.

STATEMENT REGARDING FEDERALLY SPONSORED RESEARCH OR DEVELOPMENT

Not Applicable.

BACKGROUND OF THE INVENTION

1. Field of the Invention

The present invention relates to a golf club head. More specifically, the present invention relates to a golf club head composed of a composite material.

2. Description of the Related Art

In recent years, substantial attention has been directed toward the development of golf club heads having desired weight characteristics and, in particular, toward the development of golf club heads having a desired center of gravity location. For example, a designer may want to locate the center of gravity of a golf club head in a predetermined or preferred position relative to the face or "sweet spot" of the golf club head so as to make the golf club head more forgiving upon the occurrence of off-center hits.

Because conventional golf club heads are typically made from metal alloys or other materials having a substantially homogeneous density, the weight characteristics of such golf club heads are typically defined by their overall shape. Thus, to alter the location of the center of gravity of a golf club head, it is often necessary to redesign the shape or configuration of the golf club head. However, this may adversely impact other desired characteristics of the golf club head.

The design process may be further complicated where golf club heads are manufactured using composite materials. Because composite materials are typically less dense than metal and other conventional materials, composite golf club heads generally require additional weighting to achieve desired swing weights for finished golf clubs.

The Rules of Golf, established and interpreted by the United States Golf Association ("USGA") and The Royal and Ancient Golf Club of Saint Andrews, set forth certain requirements for a golf club head. The requirements for a golf club head are found in Rule 4 and Appendix II. A complete description of the Rules of Golf are available on the USGA web page at www.usga.org. Although the Rules of Golf do not expressly state specific parameters for a golf club, Rule 4-1d states that the club head shall be generally plain in shape, and all parts shall be rigid, structural in nature and functional.

Many solutions have been proposed to adjust and/or increase the weight of composite golf club heads. For example, a weighting agent or material is often introduced into a cavity within a golf club head subsequent to manufacture. In the case of wood type golf club heads, the cavity may be enclosed by the face, sides, sole and crown of the golf club head. However, it is not uncommon for cavities also to be formed, for example, in the sole, heel or toe regions of iron or putter type golf club heads. Because of limited access to the cavities, however, such weighting materials may not be placed as precisely as desired and may not provide the ability to adjust the weight of the golf club heads, or the location of the center of gravity of the golf club heads, very precisely. Furthermore, such materials may dry and separate from the walls of the golf club heads during use, adversely affecting the weight of the golf club heads and possibly creating a distracting sound or feel when the golf clubs are swung.

Alternatively, a composite golf club head may be provided with a metal sole plate or, in the case of wood type golf club heads, a solid or foam core. However, the use of metal sole plates may add undesirable steps in the process of making the golf club heads, and the use of solid or foam core materials has been shown generally to be ineffective for adjusting the location of the center of gravity and moments of inertia of golf club heads. The reason for this is that solid or foam core materials generally have a uniform density, making it difficult to adjust the location of the center of gravity or moments of inertia of the golf club head without simultaneously altering the shape or configuration of the golf club head. Additionally, such materials may result in voids within the golf club head.

For a golf club head including composite material, higher density layers of composite fiber may be provided in the wall of the golf club head to increase its weight. However, such changes in the layers of composite material may affect the structural characteristics of the golf club head.

In view of the foregoing, there appears to be a substantial need for improved methods of manufacturing composite golf club heads and, in particular, for methods that allow for more effective adjustment of the weight characteristics of golf club heads without substantially affecting the structural characteristics of the golf club heads.

There also appears to be a need for improved composite golf club heads manufactured in accordance with such methods.

BRIEF SUMMARY OF THE INVENTION

One aspect of the present invention is a composite golf club head having a weight strip in a ribbon section of the club head. The golf club head has a body having a hollow interior and is composed of a composite material. The body has a face, a sole, a crown, a ribbon juxtaposed by the sole and the crown, a heel end and a toe end. The golf club head also has a weight strip composed of a material having a density greater than the composite material. The weight strip is disposed on the ribbon.

Another aspect of the present invention is a composite golf club head having multiple weight strips in a ribbon section of the club head. The golf club head has a body having a hollow interior and composed of a composite material. The body has a face, a sole, a crown, a ribbon juxtaposed by the sole and the crown, a heel end and a toe end. The golf club head also has a plurality of weight strips. Each of the plurality of weight strips is composed of a material having a density greater than the composite material. Each of the plurality of weight strips is disposed on the ribbon. Each of the weight strips is shaped to occupy a predetermined space within the ribbon. The number of weight strips may range from two to fifty, preferably two to ten, and most preferably three.

Yet another aspect of the present invention is a method for producing a composite golf club head having a weight strip embedded in its ribbon. The method includes placing layers of plies of pre-preg sheets in a mold. The mold has the shape of a golf club head having a face, a sole, a crown, a ribbon juxtaposed by the sole and the crown, a heel end and a toe end. The method also includes placing a weight strip in the ribbon area of the mold. The method also includes curing the layers of plies pre-preg sheets and weight strip to create a golf club head composed of a composite material with a weight strip therein.

The golf club head of the present invention is composed of a plurality of plies of pre-preg, has a tungsten weight strip, has a volume of greater than 320 cubic centimeters, and has a weight ranging from 188 to 195 grams.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

As shown in FIGS. 1–4, a golf club head of the present invention is generally designated 20. The club head 20 may be a fairway wood or a driver. The club head 20 has a body 22 that is generally composed of a composite material such as plies of carbon pre-preg sheets. The body 22 has a crown 24, a face 26, a sole 28 and a ribbon 30 juxtaposed by the sole 28 and the crown 24. The ribbon 30 generally extends from a toe end 32 to a heel end 34. The ribbon 30 generally begins at one end of the face 26 and ends at an opposite end of the face 26. A rear 36 of the body 22 is opposite the face 26 and is defined by portions of the ribbon 30, the crown 24 and the sole 28. The ribbon 30 increases the volume of the club head 20 and also assists in creating a club head 20 with a higher moment of inertia as described in greater detail below. Also, at the heel end 34 of the club head 20 is a hosel 38 with a shaft opening 39 for insertion of a shaft therein.

As shown in FIGS. 5–8, the club head 20 has a weight strip 40 disposed in the ribbon 30 of the club head 20. The weight strip 40 is preferably embedded within layers of the plies of pre-preg 41a–b as described in greater detail below. A sole plate 42 is attached to the sole 28 of the body 22.

Figure 1:
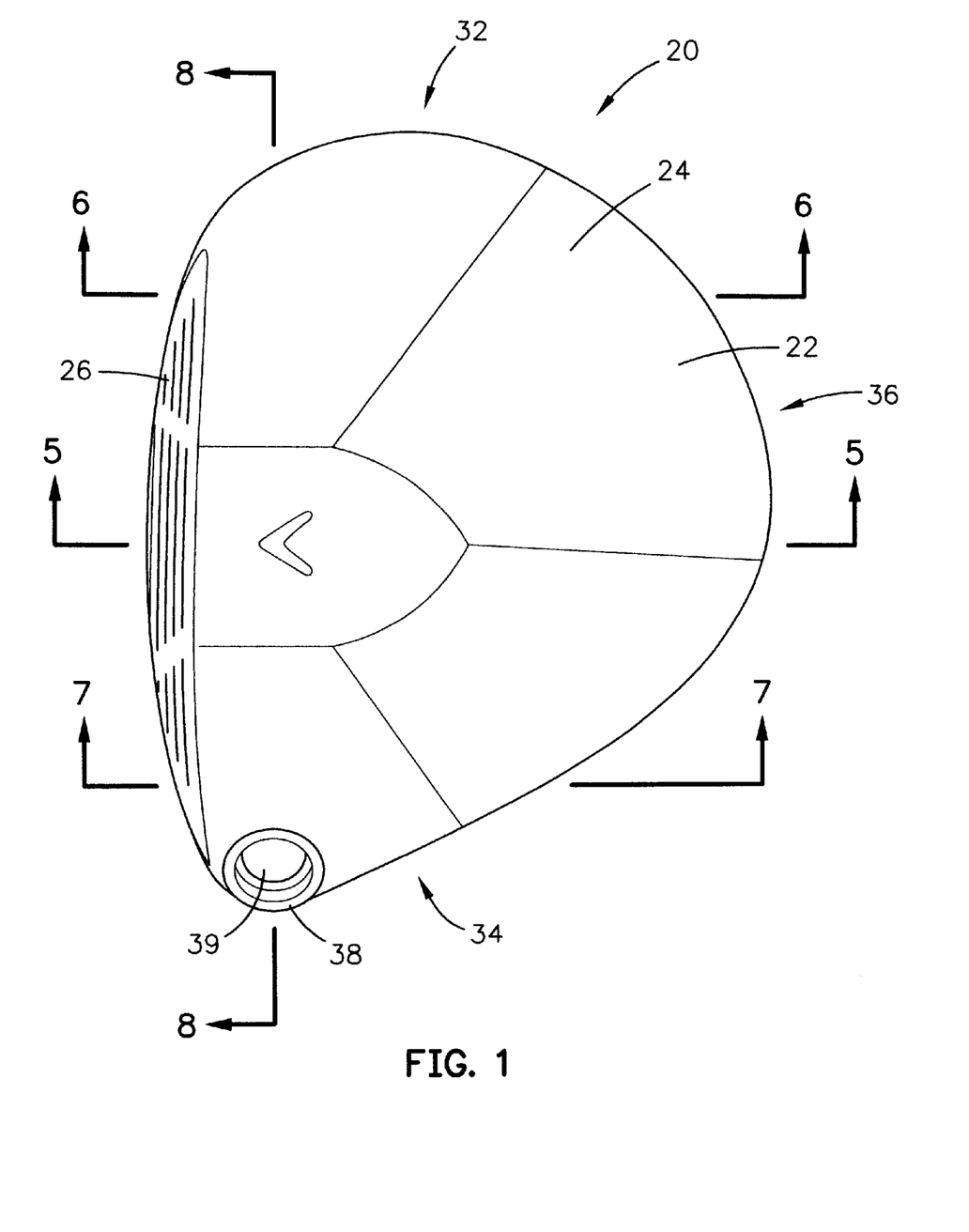
FIG. 1 is a top plan view of a golf club head of the present invention.
Figure 2:
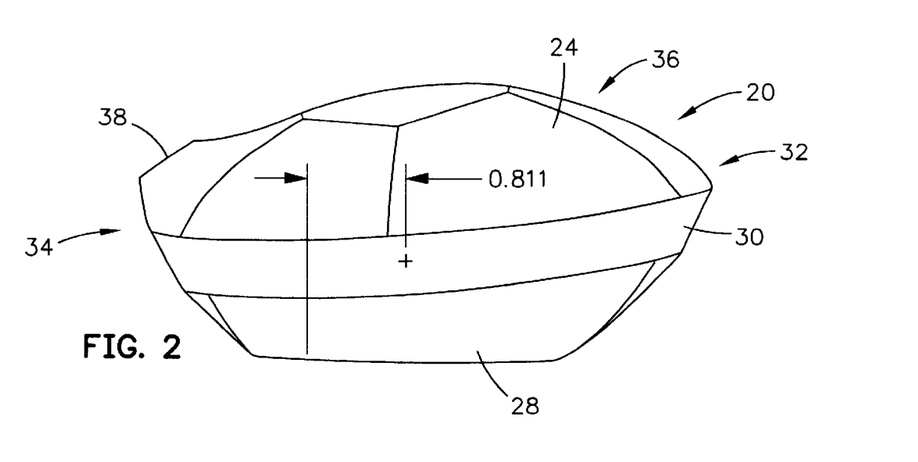
FIG. 2 is a rear view of the golf club head of FIG. 1.
Figure 3:
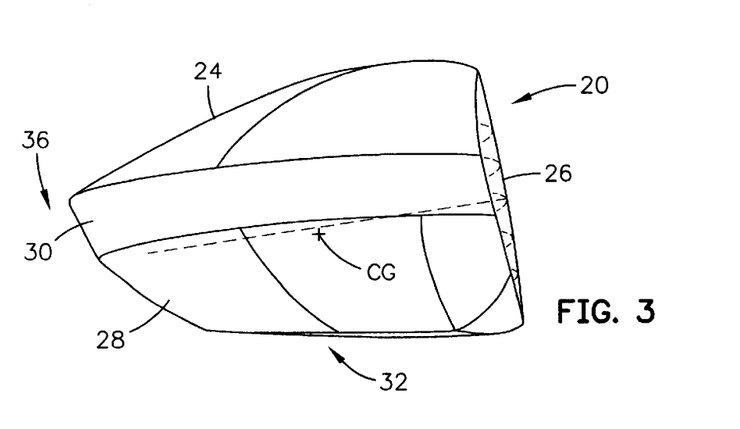
FIG. 3 is a toe end view of the golf club head of FIG. 1.
Figure 4:
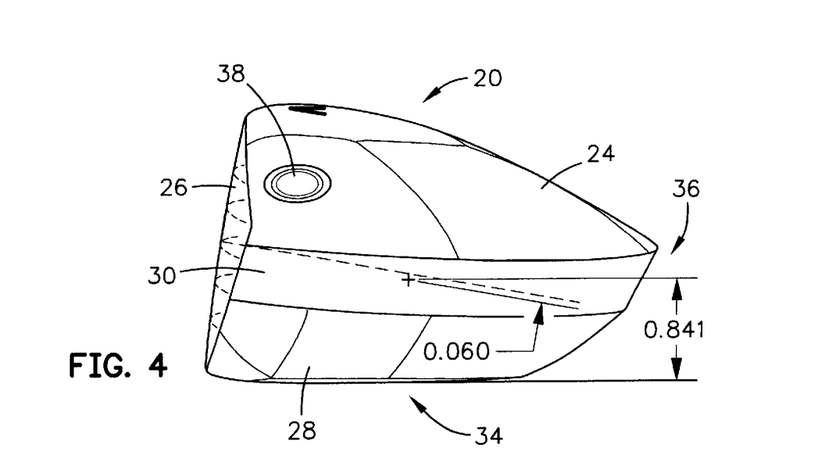
FIG. 4 is a heel end view of the golf club head of FIG. 1.
Figure 5:
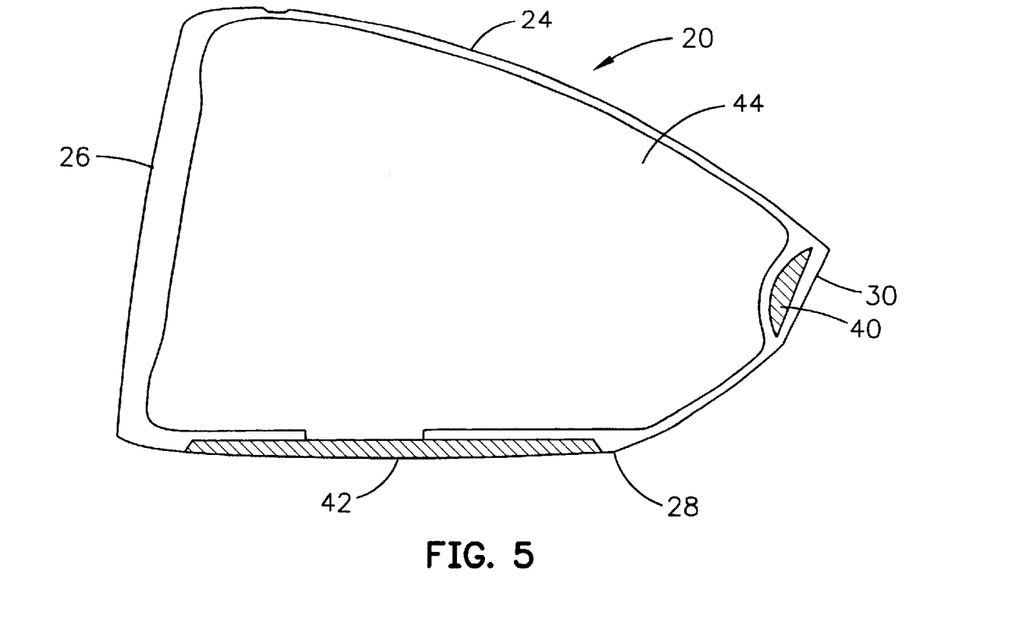
FIG. 5 is a cross-sectional view of the golf club head of FIG. 1 along line 5—5.
Figure 6:
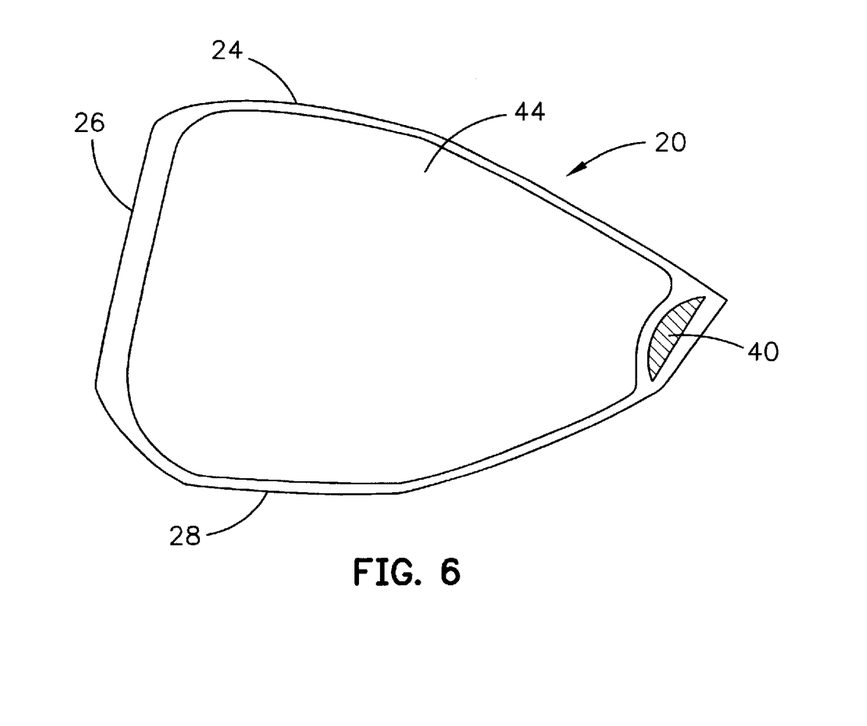
FIG. 6 is a cross-sectional view of the golf club head of FIG. 1 along line 6—6.
Figure 7:
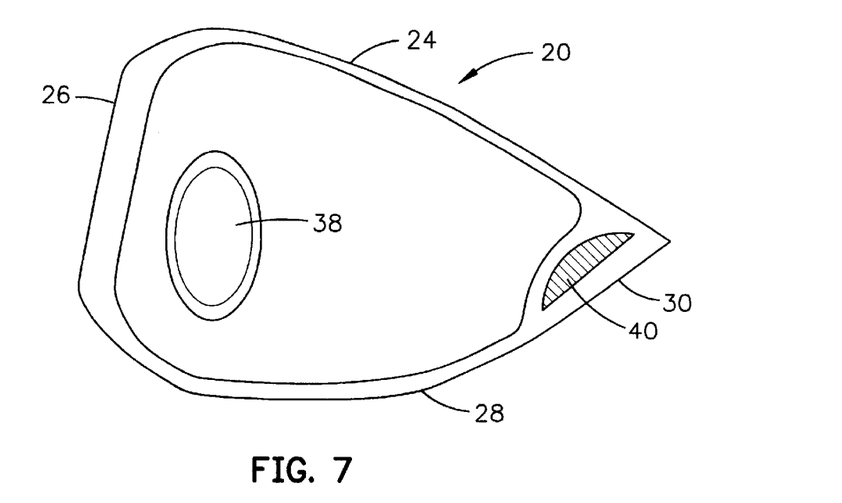
FIG. 7 is a cross-sectional view of the golf club head of FIG. 1 along line 7—7.
Figure 8:
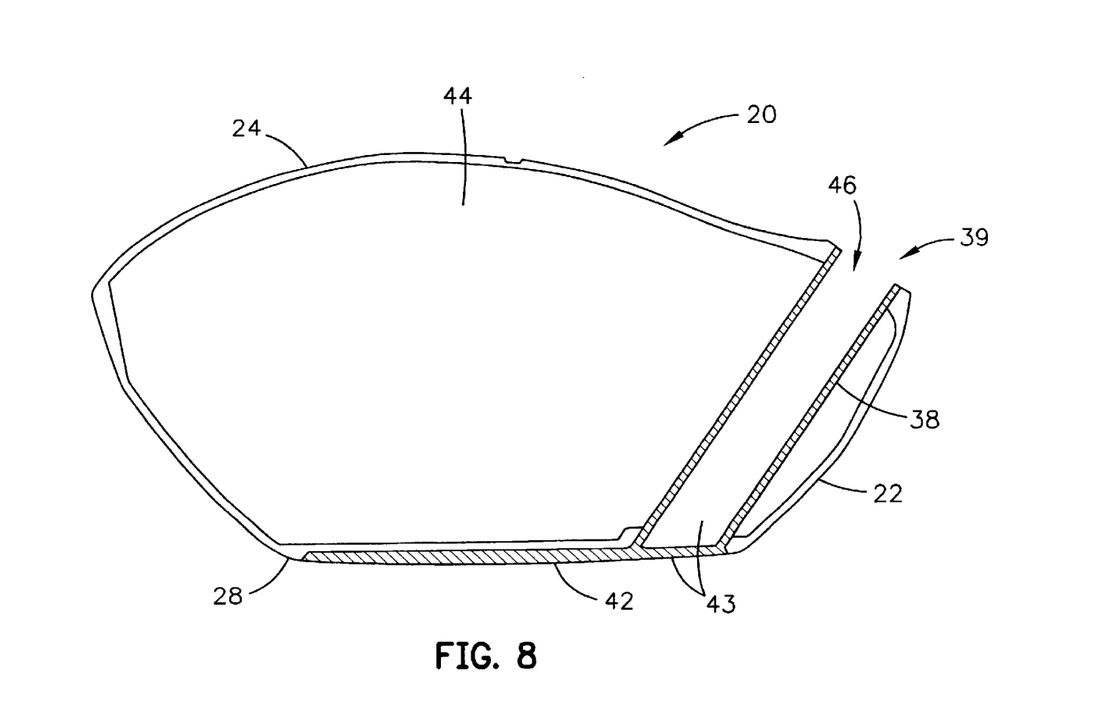
FIG. 8 is a cross-sectional view of the golf club head of FIG. 1 along line 8—8.

As shown in FIG. 8, sole plate 42 may be integral with the hosel 38 forming a sole plate hosel integral piece 43 that is incorporated into the club head 20. The hosel 38 lies within the hollow interior 44 of the club head 20. Preferably, the club head 20 has a hollow interior 44, however, the light weight of the composite body 22 allows for numerous manipulations in placement of weight, foam, sound enhancing devices and the like within the hollow interior 44.

Figure 9:
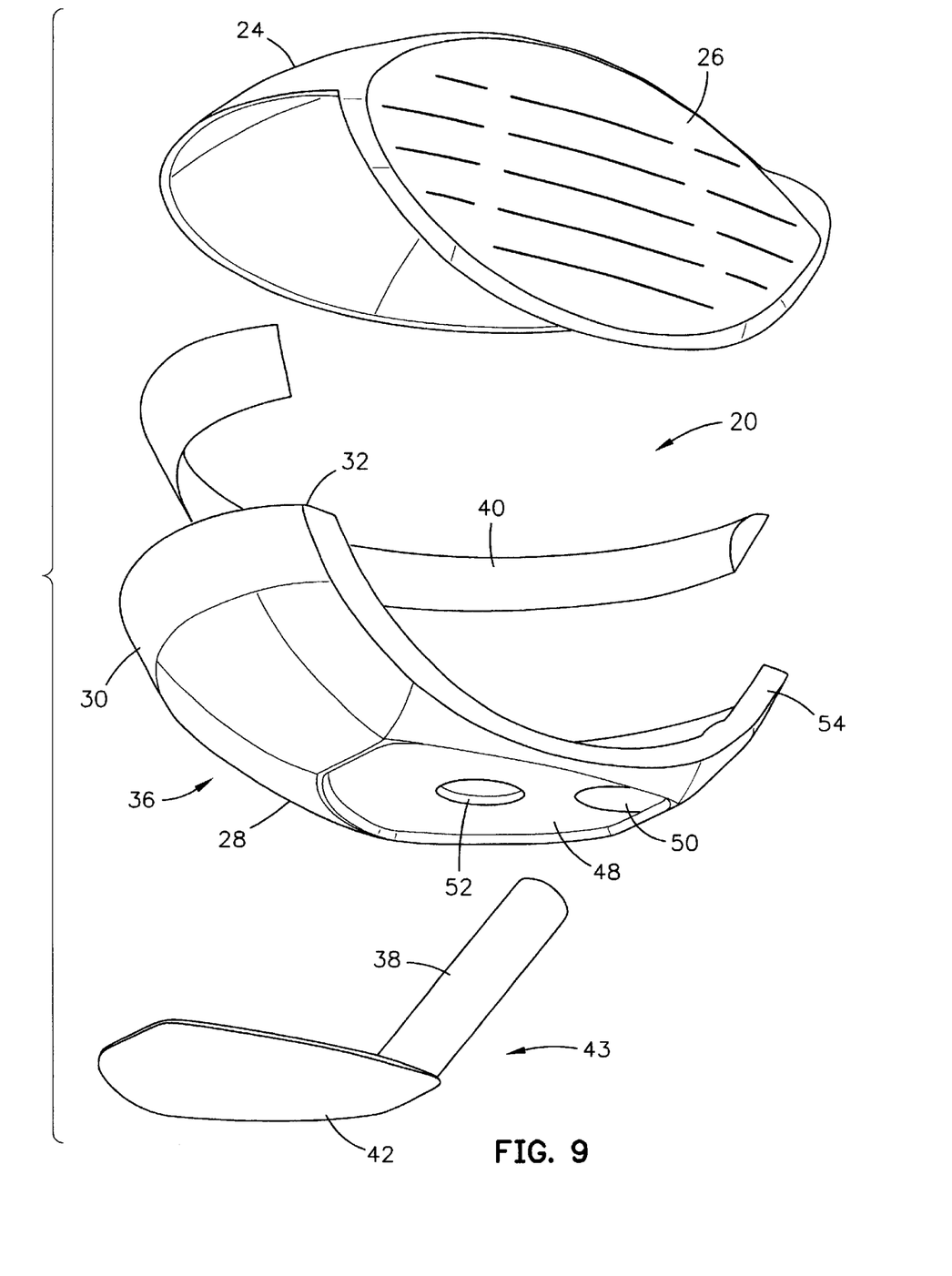
FIG. 9 is an exploded view of the golf club head of the present invention.

As shown in FIG. 9, the sole plate hosel integral piece 43 is inserted into a sole cavity that is shaped to accommodate the sole plate 42. The hosel 38 is inserted through a hosel aperture 50 to connect with the shaft opening 39 for placement of a shaft therethrough. A sole plate aperture 52 allows for access to the hollow interior 44 through the sole 28 which is utilized for fabrication of club head 20 as described below. In a preferred embodiment, the sole plate hosel integral piece 43 is composed of a stainless steel material. The sole plate hosel integral piece 43 is further described in co-pending U.S. patent application Ser. No. 09/474,927, filed on Dec. 29, 1999, and entitled Integral Sole Plate And Hosel For A Golf Club Head, which is hereby incorporated in its entirety.

The weight strip 40 is preferably composed of a metal material such as copper, tungsten, steel, aluminum, tin, silver, gold, platinum, or the like. A preferred metal is copper. The weight strip 40 has a density greater than the composite material of the body 22. Preferably, the weight strip 40 extends from approximately the heel end 34 of the face 26 through the rear 36 to the toe end 32 of the face 26. However, the weight strip 40 may only extend along the rear 36 of the ribbon 30, the heel end 34 of the ribbon 30, the toe end 32 of the ribbon 30, or any combination thereof. Preferably, the weight strip 40 occupies the majority of area of the ribbon 30. However, the weight strip 40 may only occupy a small area of the ribbon 30.

Figure 9A:
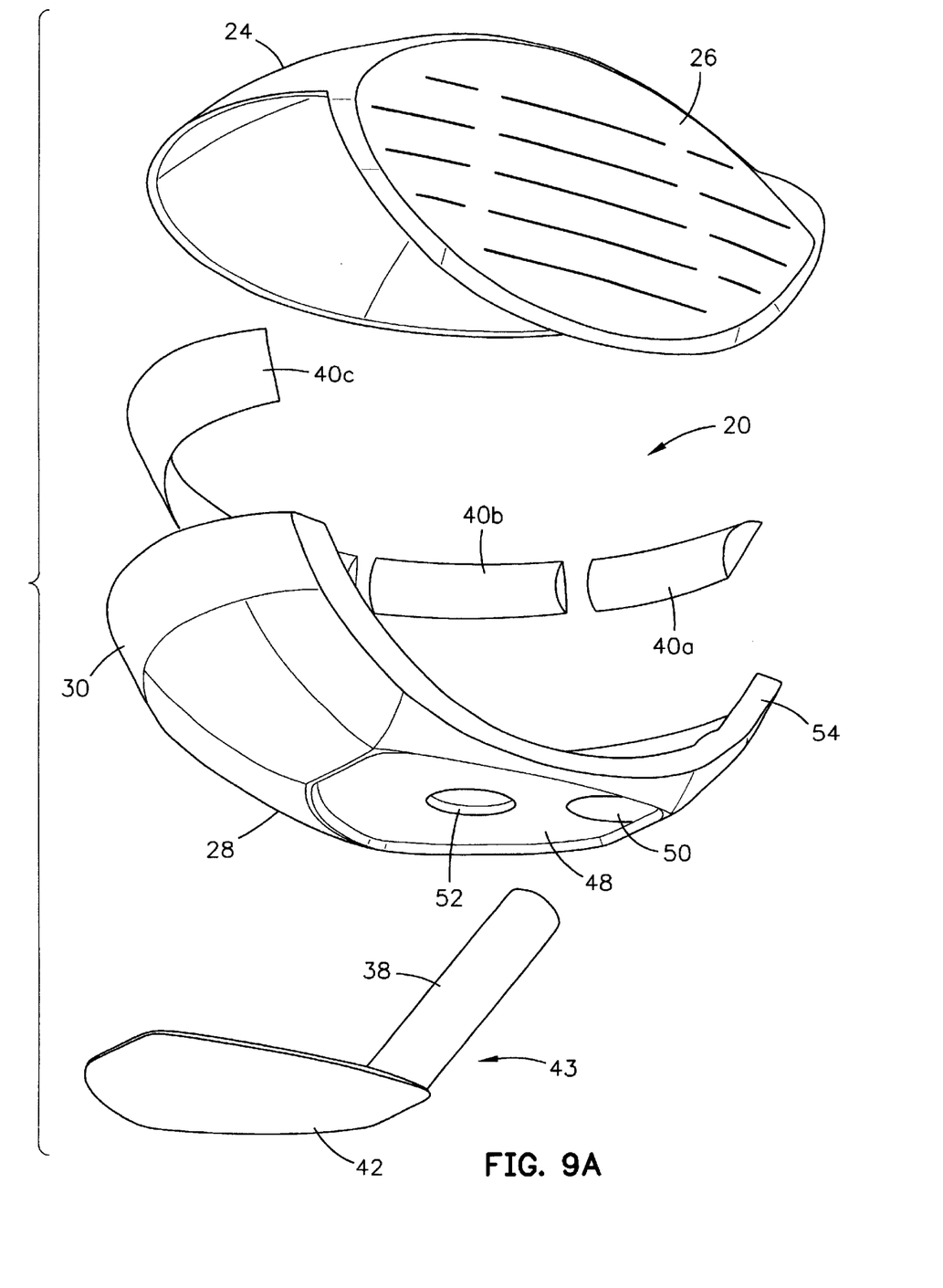
FIG. 9A is an exploded view of an alternative embodiment of the golf club head of the present invention.

In preferred embodiment, the weight strip 40 is a single piece co-cured to the ribbon 30. However, the weight strip 40 may be two, three, four, or more pieces co-cured to the ribbon and extending along a portion of the ribbon 30. The multiple piece weight strip 40 may be partitioned horizontally or vertically. For example, as shown in FIG. 9A, three separate weight strips 40a–c are positioned in the toe end 32 of the ribbon 30, the rear 36 of the ribbon 30, and the heel end 32 of the ribbon 30.

Figure 9B:
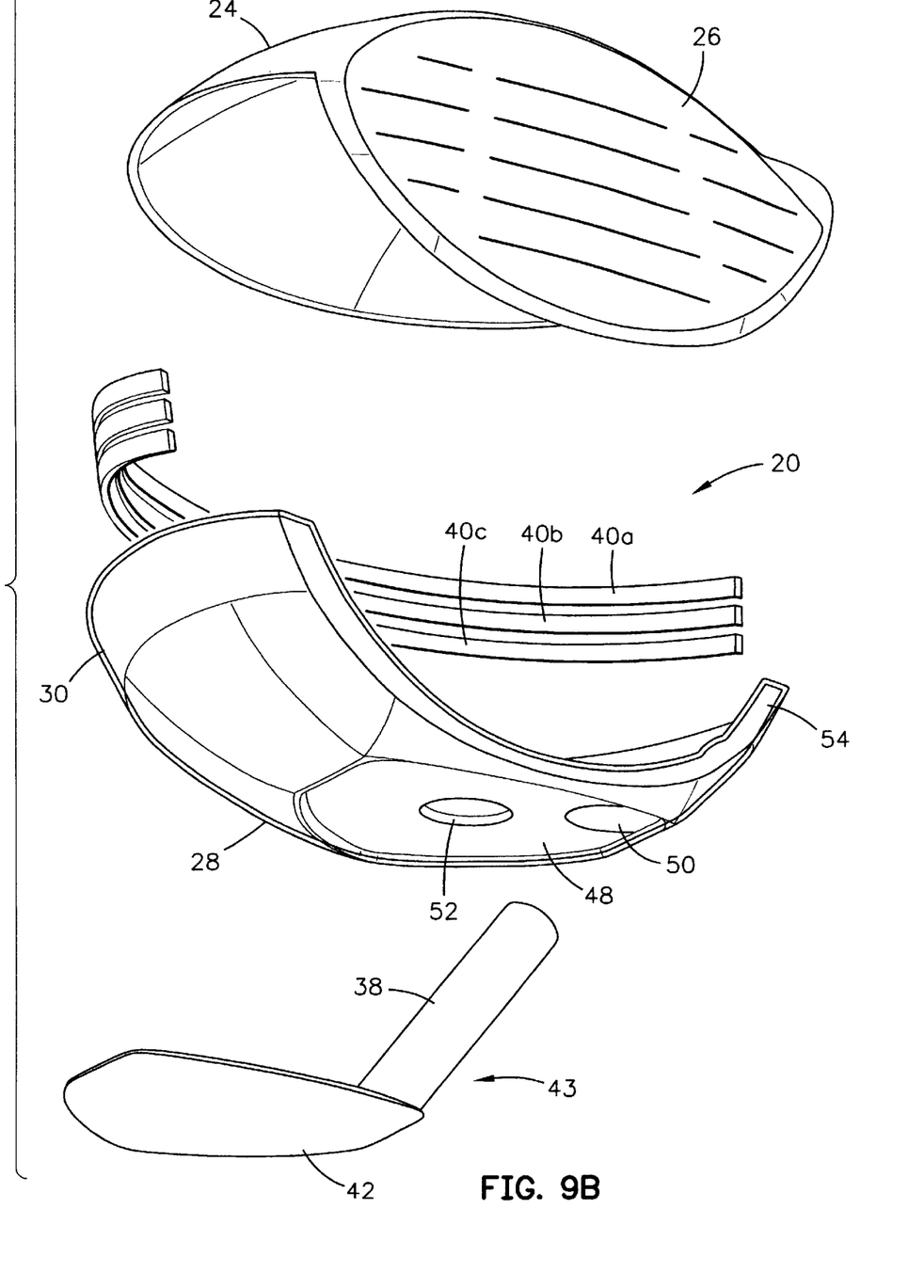
FIG. 9B is an exploded view of another alternative embodiment of the golf club head of the present invention.
Figure 9C:
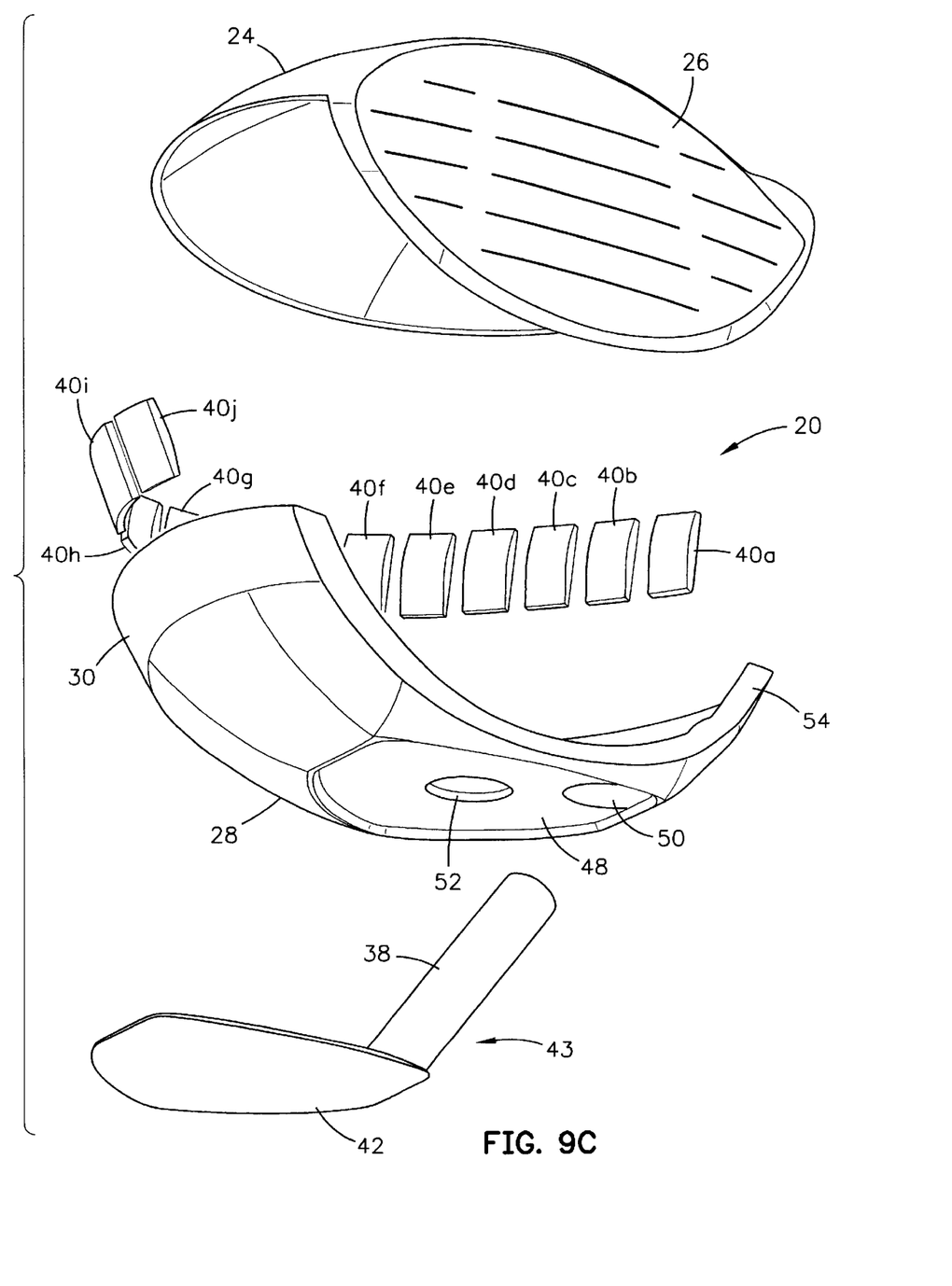
FIG. 9C is an exploded view of yet another alternative embodiment of the golf club head of the present invention.

In an alternative embodiment as shown in FIG. 9B, three separate weight strips 40a–c are parallel to each other and extend along substantially the entire length of the ribbon 30. In yet another alternative embodiment shown in FIG. 9C, multiple weight strips 40a–j are evenly distributed along the entire length of the ribbon 30. Those skilled in the pertinent art will recognize that numerous variations for the weight strip 40 are possible without departing from the scope and spirit of the present invention.

As previously stated, the preferred composite material is plies of carbon pre-preg sheets. Plies of pre-preg composite sheets are manufactured by pulling strands of fiber in a parallel motion, preferably carbon or glass fiber, through a resin film and allowing the resin to partially cure or "stage". When the resin is partially staged, the resin holds the fibers together such that the fibers form a malleable sheet with all of the fibers in a specific orientation relative to an edge of the sheet. Exemplary carbon pre-preg fiber sheets may be obtained from Newport Composites of Santa Ana, Calif., Fiberite Inc. of Greenville, Tex., or Hexcel Inc. of Pleasonton, Calif. Alternatively, the layers 41a–c of the composite body 22 may comprise a plurality of plies of composite fiber without any resin, each typically comprising a continuous fiber braid or mat, that are used to make a dry reinforcement preform, as described in co-pending U.S. patent application Ser. No. 08/958,723, filed on Oct. 23, 1997, which is hereby incorporated by reference in its entirety.

The composite body 22 may include one or more plies of pre-preg that define structurally the various walls of the golf club head 20. Stated differently, the plies of pre-preg composite sheet are selected and included in the various walls of the golf club head 20 based upon the structural characteristics desired for a finished golf club head. As will be understood by those skilled in the art, the simplified arrangement of plies shown in the figures is merely demonstrative of one configuration that a designer might select. Numerous other configurations may, of course, be utilized depending upon the desired structural characteristics of the golf club head 20. One such configuration is set forth in co-pending U.S. patent application Ser. No. 09/474,670, filed on Dec. 29, 1999, entitled Composite Golf Club Head And Manufacturing Method, which is hereby incorporated by reference in its entirety.

Figure 10:
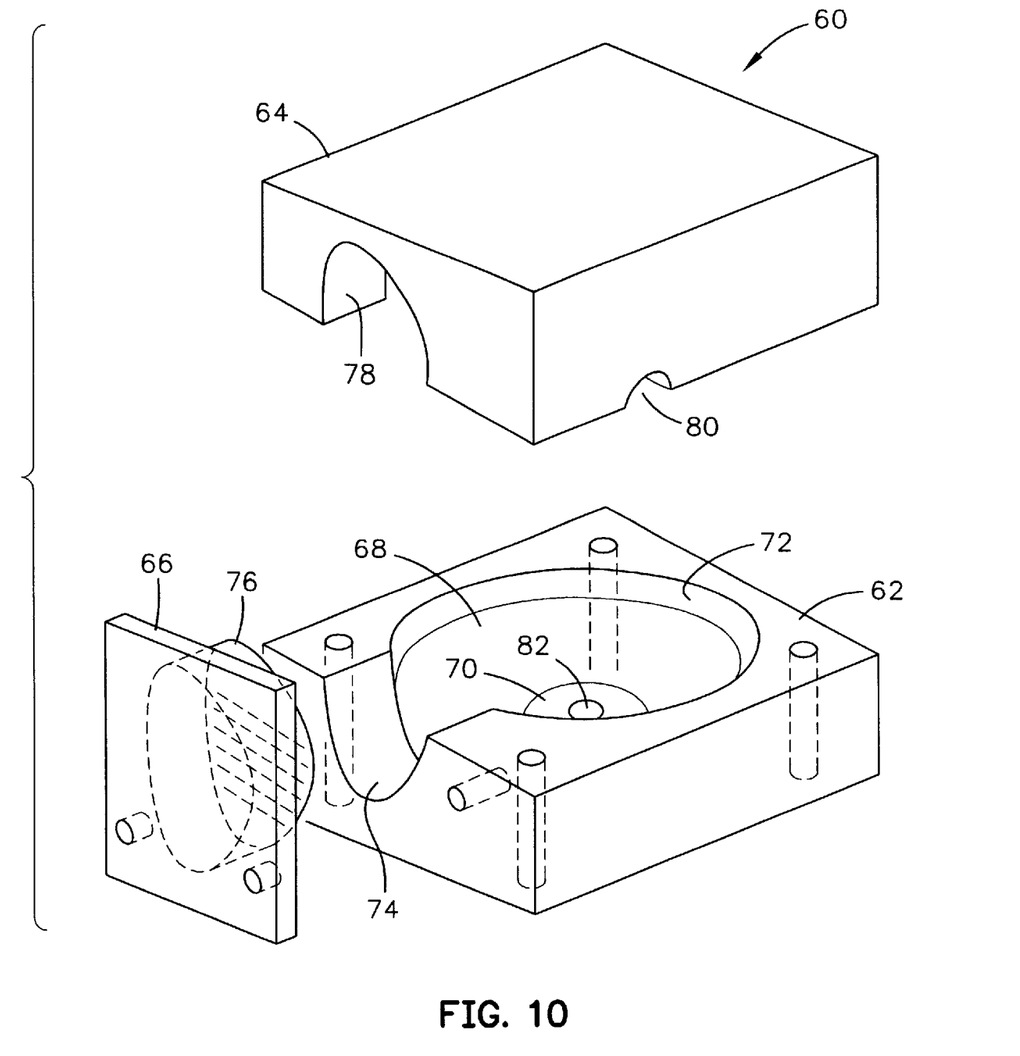
FIG. 10 is a perspective view of a three-piece mold for fabricating the golf club head of the present invention.

The forming mold may be male or female, although female forming molds are presently preferred. As shown in FIG. 10, the mold 60 is composed of three pieces, a sole piece 62, a crown piece 64 and a face piece 66, which are brought together during the molding process. The face piece 66 may be attached to the crown piece 64 prior to placement of the plies thereon. The sole piece 62 has a main cavity 68 with a sole plate bulge 70 and a ribbon section 72. The sole piece 62 also has a front opening 74. The face piece 66 has a face projection 76 that is placed in the front opening of the sole piece 62. The crown piece 64 has a crown cavity 78. The sole piece 62 also has a bladder port 82.

The plies of pre-preg 41a–b and the weight strip 40 are applied to the forming mold 60 in a predetermined manner to create a preform. Preferably, one or more layers of plies of pre-preg 41b having a selected shape and mass are first applied to predetermined locations on the forming mold 60. The weight strip 40 is then placed within the ribbon section 72 of the sole piece 62. Then, additional plies of pre-preg 41a are applied over the weight strip 40, thereby resulting in the weight strip being embedded in the ribbon 30 of the composite body 22 of the preform.

Alternatively, additional plies of pre-preg 41a–c are not placed over the weight strip 40, resulting in the weight strip 40 having one surface co-cured to the interior wall of the ribbon 30 of the body 22, and another surface exposed to the hollow interior 44. Plies of pre-preg 41a–c are placed over the face bulge 76, the crown cavity 78 and the sole cavity 68, and then the pieces are assembled together.

Because the golf club head 20 comprises a substantially enclosed composite body 22 having a hollow core 44, it may be necessary to make a preform in two or more separate pieces or sections, which may be assembled and cured into a finished golf club head 20.

Figure 11:
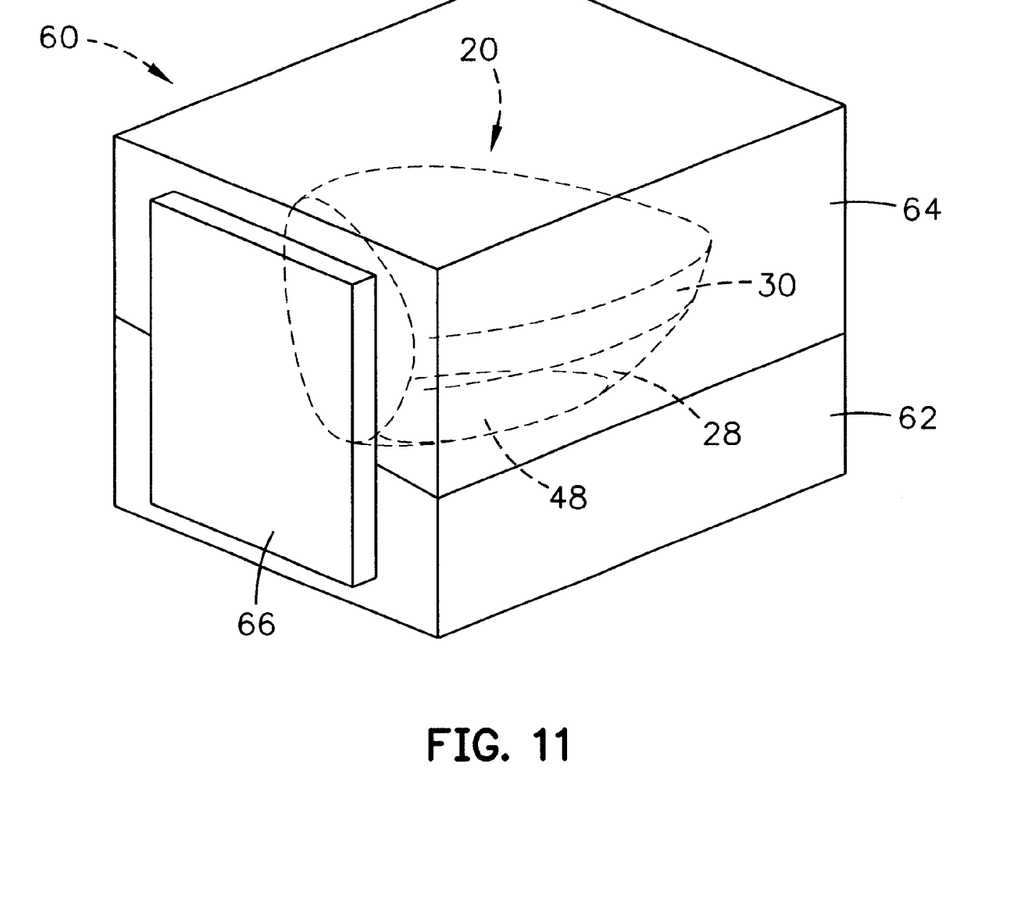
FIG. 11 is an isometric view of a golf club head within a mold.
Figure 12:
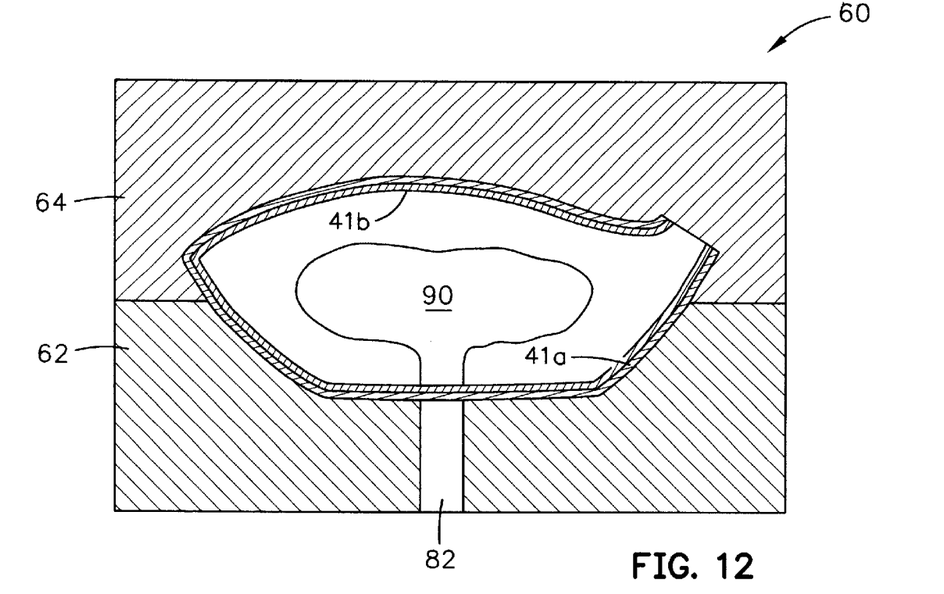
FIG. 12 is a cross-sectional view of a mold during fabrication of a golf club head of he present invention.
Figure 13:
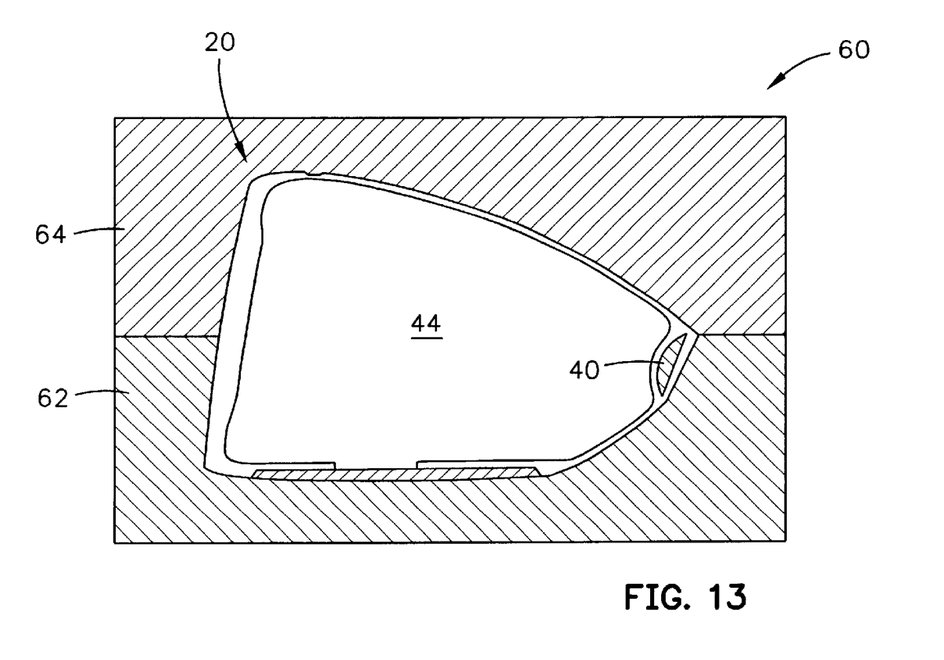
FIG. 13 is a cross-sectional view of a golf club head of the present invention within a mold.

As shown in FIG. 12, once the pieces of the mold 60 are assembled together, an inflatable bladder 90, preferably made from latex, silicone, or similar materials, may be introduced into the hollow core 44, through the port opening 82. The resulting opening 52 of the golf club head 20 is covered by the sole plate 42. Once the bladder 90 has been positioned within the hollow core 44 of the preform, a source of pressurized gas (not shown) may be attached by a gas line to the bladder 90, and the bladder 90 may be inflated within the hollow core 44. The bladder 90 thereby engages the inside surfaces of the preform, forcing the plies of pre-preg 41a–c and the weight strip 40 against the inner wall of the mold 60. The mold 60 may then be heated at a predetermined temperature for a selected period of time, i.e., a time sufficient to allow proper curing of the resin within the plies of pre-preg 41a–c and weight strip 40. After depressurizing, the bladder 90 may be removed through the port opening, and the golf club head 20 may be removed from the mold 60. The finished golf club head 20 within the mold 60 is shown in FIGS. 11 and 13.

Those skilled in the art will appreciate that, depending upon the type of resin used, curing temperatures may range from 250° to 800° F., the requisite curing time may range from a few minutes (for example, in the case of a "quick cure" epoxy or a thermoplastic resin) to 1.5 hours, and the pressure applied via the latex or silicone bladder 90 may range from 100 to 300 psi.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim as our invention:

1. A golf club head of the fairway wood or driver type comprising:

a body having a hollow interior and composed of a plurality of layers of plies of carbon pre-preg sheets;

wherein the body has a face, a sole having a soleplate with an integral hosel tube, a crown, and a ribbon juxtaposed by the sole and the crown extending from a heel end to a toe end of the golf club face;

the soleplate being comprised of stainless steel is disposed within a recess of the sole and the hosel tube also being comprised of stainless steel lies within the hollow interior of the club head extending from the soleplate aperture to the crown;

a weight strip composed of tungsten having a density greater than the plies of pre-preg material, is co-cured to the ribbon between the plurality of layers of plies of pre-preg material in the ribbon;

the weight strip extends from the toe end of the ribbon to the heel end of ribbon; and the golf club head has a weight ranging from 188 grams to 195 grams and a volume in excess of 320 cubic centimeters.

2. The golf club head according to claim 1 wherein the weight strip is composed of two or more pieces.

3. The golf club head according to claim 1 wherein the weight strip occupies at least fifty percent of the area of the ribbon.

4. The golf club head according to claim 1 wherein the weight strip occupies the majority of the area of the ribbon.

* * * * *